Figure 1:
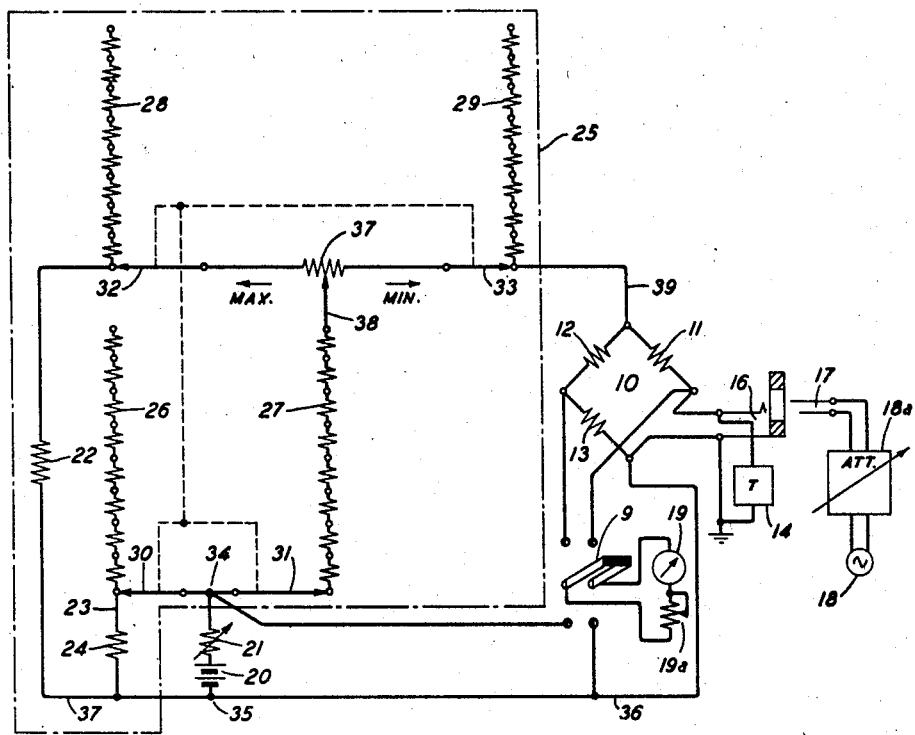

Feb. 18, 1947. E. W. HOUGHTON 2,415,823
ELECTRICAL EQUIPMENT
Filed Aug. 22, 1944

INVENTOR
E. W. HOUGHTON
BY
ATTORNEY

Patented Feb. 18, 1947

2,415,823

UNITED STATES PATENT OFFICE 2,415,823

ELECTRICAL EQUIPMENT

Edward W. Houghton, Chatham, N. J., assignor to Bell Telephone Laboratories, Incorporated, New York, N. Y., a corporation of New York Application August 22, 1944, Serial No. 550,666

1 Claim. (Cl. 171—95)

This invention relates to a Wheatstone bridge embodying a thermistor arm for comparing alternating current power with direct current power. Particularly, it relates to an adjustable resistance network calibrated for varying the direct current power into the thermistor arm in directly indicated values.

Heretofore, a Wheatstone bridge embodying in one arm a thermistor material which is a resistance material varying its effective resistance greatly with temperature, has been utilized for comparing alternating current with direct current. Such bridge is normally balanced with direct current before the alternating current is applied to the thermistor arm. After the alternating current has been applied to such arm, the direct current is varied until bridge balance is restored. This enables the determination of the amount of alternating current or voltage applied to the thermistor arm.

Obviously the use of such bridge for comparing alternating current power with direct current power would involve computations to determine the amount of direct current power effective at each bridge balance. Such bridge, if contemplated for use in the factory or field, would require trained personnel for performing the computations with a high degree of accuracy. This would tend to occasion errors due to the human factor involved, and at the same time to retard factory production because of the time required for the computations.

The present invention is concerned with indicating directly the amount of direct current power used for comparison with alternating current power in such manner as to obviate extensive computations, except a mental operation of simple arithmetical subtraction.

The object of the invention is to indicate directly a known amount of direct current power with which an unknown amount of alternating current power is to be compared.

In accordance with a specific embodiment as used with a Wheatstone bridge having a microammeter connected across one diagonal and embodying a thermistor arm to which both alternating and direct current power can be effectively applied, the present invention comprises a resistance network calibrated in predetermined steps of effective resistance for varying the direct current power into the thermistor arm in directly indicated steps of, say, 1 milliwatt over a preselected range. In the absence of ambient heating effects, the effective resistance of the thermistor arm is a function of the power supplied thereto.

In operation, with the alternating current power withheld from the thermistor arm, the calibrated network is adjusted (1) until a zero reading produced on the microammeter indicates bridge balance at a first value of direct current power which is indicated in milliwatts on the calibrated network, and (2) thereafter until a 100-microampere reading produced on the microammeter indicates bridge unbalance at a second value of direct current power which is indicated in milliwatts on the calibrated network. The difference between the two readings of the calibrated network in milliwatts represents directly the amount of direct current power, say 1 milliwatt, causing the bridge unbalance at the 100-microampere reading. This 100-microampere reading also calibrates the microammeter and can be varied from 0 to 100 to provide a direct reading of 1 milliwatt, or a fraction of 1 milliwatt, on the microammeter.

Next, the calibrated network is adjusted to that position which causes the first value of direct current power to be applied to the thermistor arm and thereby the zero reading to be produced on the microammeter. Then the alternating current power is supplied to the thermistor arm and adjusted until the microammeter reading is made exactly 100 microamperes. As 1 milliwatt of direct current power was previously required to produce a similar bridge unbalance and the consequent reading of 100 microamperes on the microammeter, an equivalent amount of alternating current power or 1 milliwatt, is being applied to the thermistor arm. A reading on the microammeter lying between 0 and 100 indicates directly that a fraction of 1 milliwatt of alternating power is being applied to the thermistor arm; and a reading lying between 100 and 200 microamperes indicates directly that 1 milliwatt plus a fraction of 1 milliwatt of alternating current power is being applied to the thermistor arm.

Another method of comparing the direct and alternating current powers concerns adjusting the calibrated network to balance the bridge to provide the zero reading on the microammeter in the manner above explained, and thereafter adjusting the calibrated network to remove one or more milliwatts of direct current power from the thermistor arm. This causes an off-scale reading, below zero, on the microammeter. Then the alternating current power is applied to the thermistor arm and adjusted until the zero reading is restored. The difference between the two readings in milliwatts on the calibrated network represents the amount of alternating current power being applied to the thermistor arm.

A further method of comparing the direct and alternating current powers involves (1) adjusting the calibrated network which also includes a calibrated potentiometer to balance the bridge and thereby establish the zero reading on the microammeter when only the direct current power is applied to the thermistor arm, and (2) applying the alternating current power to the thermistor arm and then adjusting both the calibrated network and potentiometer to balance the bridge and thereby restore the zero reading to microammeter. The difference between the combined readings of the calibrated network and potentiometer at each bridge balance represents the amount of direct current power applied to the thermistor arm.

Figure 2:
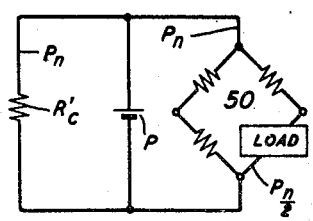
Figure 3:
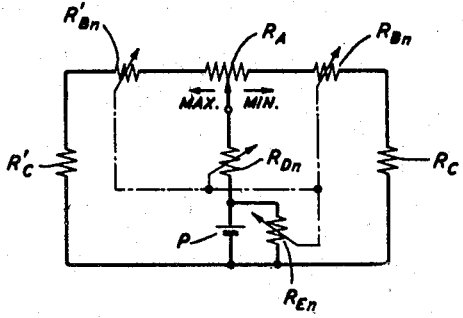

The invention will be readily understood from the following description taken together with the accompanying drawing in which:

Fig. 1 is a schematic circuit of a Wheatstone bridge measuring circuit adapted with a specific embodiment of the present invention; and Figs. 2 and 3 are schematic circuit illustrations in simplified form of fundamental principles embodied in Fig. 1.

Referring to Fig. 1, a Wheatstone bridge 10 comprises resistance arms 11, 12 and 13 of a fixed resistance characteristic, and a resistance arm 14 embodying a thermistor provided with a temperature coefficient of resistance. Applied to the bridge arm 14 through a connectible jack 16 and plug 17 is a source 18 of alternating current having an unknown value of power to be measured in accordance with the present invention which will be hereinafter explained. A device 18a varies the power of the alternating current for a purpose that will later appear. A double pole, double throw, switch 9 in its upper position connects microammeter 19 in series with a manually variable resistor 19a across the horizontal diagonal of the bridge 10 and in its down position connects both of them across the points 34 and 35. A source 20 of direct current energizes the thermistor arm 14 under control of a manually variable resistor 21.

In accordance with a specific embodiment the present invention comprises an attenuator 25 consisting of branches 26, 27, 28 and 29, each including a plurality of fixed contacts connecting in series a plurality of individual resistors of preselected values of resistance with which branches are associated movable arms 30, 31, 32 and 33 respectively, mechanically connected together and manually operated as a unit. A junction point 34 of the arms 30 and 31 is connected to one end of the variable resistor 21 which has its opposite end connected to the positive terminal of the direct current source 20. The negative terminal of this source is connected to a junction point 35 of adjacent ends of leads 36 and 37 of which lead 36 has its opposite end connected to the lower terminal of the vertical bridge diagonal, and lead 37 embodying resistor 22 has its opposite end applied to the lowermost contact of resistance branch 28. Lead 23 embodying a resistor 24 is connected between the lowermost contact of resistance branch 26 and lead 37. The movable arms 32 and 33 are joined through a potentiometer 31 which has a movable contact 38 connected to the uppermost contact of the resistance branch 27. A lead 39 connects the lowermost contact of resistance branch 29 to the upper terminal of the vertical bridge diagonal.

The operation of Fig. 1 will be explained first with reference to Figs. 2 and 3 which illustrate certain fundamental considerations. Referring to Fig. 2, a Wheatstone bridge 50 in the balanced condition is assumed to have an effective resistance $R_C$ which is equivalent to the resistance $R_C'$ so that the power from source P is equally divided in a value $P_n$ therebetween. Also the resistance values of the individual bridge arms is preselected such that the power $P_n$ into the bridge 50 is further divided so that one-half of such power, or a value $$\frac{P_n}{2}$$

is supplied to the load arm. Upon this basis the number of fixed steps of the total power P into the bridge 50 may be assigned as follows:

$$P_n = P_1, P_2, P_3 \ldots P_N \qquad (1)$$

where $P_1$ is the highest power step, and $P_N$ is the lowest power step. The difference in the values of the power between these steps is assumed to be a constant so that $$P_1 - P_2 = P_2 - P_3 = P_3 - P_4 = P_\Delta \qquad (2)$$

Fig. 3 is similar to Fig. 2 except it includes resistor $R_C$ (in place of its equivalent bridge 50 in Fig. 2), potentiometer $R_A$, and adjustable resistors $R_{Bn}'$, $R_{Bn}$, $R_{Dn}$, and $R_{En}$ connected together mechanically and operated as a unit on a manual basis. When the movable arm of potentiometer $R_A$ is in its minimum position, the lowest power into the bridge from the source P occurs at the step $P_1$. This has the effect of removing the entire resistance of potentiometer $R_A$ from the circuit, in so far as the resistor $R_C$ is concerned. When the movable arm of potentiometer $R_A$ is in its maximum position, the power from the source P into the resistor $R_C$ is $P_N - P_\Delta$. This has the effect of inserting the entire resistance value of potentiometer $R_A$ in the circuit, in so far as the resistor $R_C$ is concerned. Thus the resistance value of potentiometer $R_A$ is so chosen that as its movable arm is actuated from the minimum to the maximum position at each step, Equation 1, the power into the resistor $R_C$ is varied linearly from the value $P_N$ to the value $P_N - P_\Delta$. Thus the potentiometer $R_A$ serves to vary linearly the power from the value $P_\Delta$ to zero.

At the lowest power step $P_N$ the minimum resistance value of resistor $R_{Bn}$ is zero. The resistance value of $R_{Bn}$ should be so chosen for each power step, Equation 1, that a movement of the adjustable arm of potentiometer $R_A$ from the minimum to the maximum position varies the power into the resistor $R_C$ from the value $P_\Delta$ to zero. The maximum resistance value of resistor $R_{Bn}$ occurs at the highest power step $P_1$. The resistor $R_{Bn}'$ has resistance values equal to those of resistor $R_{Bn}$ as above indicated.

With the movable arm of potentiometer $R_A$ in the minimum position the maximum resistance value of resistor $R_{Dn}$ occurs at the lowest power step $P_N$; and minimum resistance value of resistor $R_{Dn}$ occurs at the highest power step $P_1$. The resistance values of resistor $R_{Dn}$ should be so chosen for the individual power steps, Equation 1, in the manner for selecting the resistance values of resistor $R_{Bn}$ for the individual power steps as previously explained.

The resistance value of resistor $R_{En}$ should be so chosen for the individual power steps, Equation 1, that the current drain on the source P is constant. This means that the same load resistance should be seen by the source P at the individual power steps, Equation 1. The highest resistance value of resistor $R_{En}$ occurs at the highest power step $P_1$, and the lowest resistance value of this resistor occurs at the lowest power step $P_N$. The resistance values of resistor $R_{En}$ for the individual power steps, Equation 1, should be chosen in the manner for selecting the values of resistor $R_{Bn}$ for individual power steps as above mentioned.

Thus in Fig. 3 the resistors $R_{En}$, $R_{Dn}$, $R_{Bn}'$ and $R_{Bn}$ constitute a manually variable attenuator provided with such steps of effective resistance that the direct current power into the bridge 50, Fig. 2, or resistor $R_C$, Fig. 3, can be varied in a plurality of steps, Equation 1, with a constant difference between successive steps, Equation 2, and that at individual steps a movement of the adjustable arm of potentiometer $R_A$ from the minimum to the maximum position varies the power into the resistor $R_C$ linearly from the value $R_A$ to zero.

The circuit of Fig. 1 embodies the above-mentioned fundamental considerations of Figs. 2 and 3 such that the following elements are equivalent in the respective circuits and perform similar functions; Wheatstone bridges 10 and 50 and resistor $R_C$; resistor 22 and resistor $R_C'$; direct current sources P and 20; bridge arm load in Fig. 2 and thermistor arm 14 in Fig. 1; potentiometers $R_A$ and 37; and direct current attenuator comprising resistors $R_{En}$, $R_{Dn}$, $R_{Bn}'$ and $R_{Bn}$ and direct current attenuator 25 comprising resistor branches 26 (including resistor 24), 27, 28 and 29 and associated movable arms 30, 31, 32 and 33 respectively. Thus are resistors $R_{En}$, $R_{Dn}$, $R_{Bn}'$ and $R_{Bn}$ in Fig. 3 are individually equivalent to the resistor branch 26 (including resistor 24) and arm 30, resistor branch 27 and arm 31, resistor branch 28 and arm 32, and resistor branch 29 and arm 33 respectively.

In the operation of Fig. 1 for measuring the power of alternating current source 18, the plug 17 is initially removed from the jack 16 to disconnect the alternating current source 18 from the thermistor arm 14. The switch 9 is operated to its down position to apply the microammeter 19 and resistor 19a across the points 34 and 35 and thereby in series with the source 20 and variable resistor 21. The resistor 21 is then manually adjusted until a preselected indication of, say 100 microamperes is produced on the microammeter 19. Thus a predetermined magnitude or standard amount of direct voltage is applied to the input of attenuator 25. As direct current flows from the source 20 through the resistor branch 27 and movable contact 38 of the potentiometer 37, this current at the latter point divides such that one-half flows into the bridge 10 and one-half flows into the resistor 22. The arms 30, 31, 32 and 33 of attenuator 25 are simultaneously moved along the contacts of the resistor branches 26, 27, 28 and 29 respectively, to change the effective direct current and voltage and thereby the effective direct current power supplied to the thermistor arm 14 until the microammeter 19 shows the nearest indication to zero. Next, the movable arm 38 of potentiometer 37 is manually adjusted to vary further the effective direct current and voltage and thereby the effective direct current power supplied to the thermistor arm 14 until the precise indication of zero is attained.

If the zero indication cannot be attained at once, the arms 30, 31, 32 and 33 of attenuator 25 should be moved upwardly or downwardly to the extent of one contact in either direction. Now the adjustment of the movable arm 38 of potentiometer 37 will produce the zero indication exactly. Further actuation of the arms 30, 31, 32 and 33 of attenuator 25 in an upward direction to the extent of one contact should cause the indication of 100 microamperes to occur again. This indication can be obtained precisely by adjusting the variable resistor 19a. The actuation of the arms 30, 31, 32 and 33 of attenuator 25 in a downward direction to the extent of one contact should cause the zero indication to occur again. This means that for each contact of actuation of the arms 30, 31, 32 and 33 of the attenuator 25, the direct current power into the bridge 10 is varied by one predetermined amount and that into the thermistor arm 14 is varied by a lesser predetermined amount. Thus the bridge 10 is balanced for direct current at the zero indication and is off-balance for direct current power at the indication of 100 microamperes by an amount which is equivalent to the difference between the one and lesser predetermined amounts of such power. If such balance is maintained for a relatively long period of time during which the voltage of source 20 tends to change, the bridge balance for direct current can be restored by a proper adjustment of the movable arm 38 of potentiometer 37.

In the bridge 10 of Fig. 1, the bridge arms 11, 12, 13 and 14 are provided with such values of effective resistance for ambient temperature in the range of 0 to 120° F. and the standard direct current power supplied to the attenuator 25 as above explained, that the one predetermined amount of direct current power applied to the bridge 10 is, say, 2 milliwatts, and the lesser predetermined amount of direct current power is, say, 1 milliwatt, applied to the thermistor arm 14. Hence, one-half of the direct current power applied to the bridge 10 is effectively impressed on its thermistor arm 14. At the condition of bridge balance (zero indication on the microammeter 19) the thermistor arm 14 has, for example, an effective resistance of 125 ohms. Thus, as the arms 30, 31, 32 and 33 of the attenuator 25 are actuated from contact to contact along the resistor branches 26, 27, 28 and 29 respectively, the direct current and voltage and thereby the direct current power into the thermistor arm 14 is varied in a plurality of steps, Equation 1 with a difference of 1 milliwatt from step to step, Equation 2. The 100-microampere indication on microammeter 19 represents the off-balance condition of bridge 10 to the extent of 1 milliwatt. The potentiometer 37 varies linearly the direct current power into the thermistor arm 14 in the range from 1 milliwatt with its adjustable contact 38 at its minimum position to 0 milliwatt with its adjustable contact 38 at its maximum position and is calibrated for such range to indicate fractions of 1 milliwatt.

The resistor 22 serves to balance the attenuator 25 so that the load on the source 20 and resistor branch 27 is constant and so that the change of 1 milliwatt of direct current power into the thermistor arm 14 can be effected regardless of the position of the movable arm 38 of the potentiometer 37. Both resistor branches 28 and 29 serve to pad out the effect of the potentiometer 37, as the power output of the direct current source 20 is varied, so that the variations of direct current power effected by the attenuator 25 remain at 1 milliwatt. The shunt branch including resistor 24 and resistor branch 26 compensates for changes in useful load, as the arms 30, 31, 32 and 33 of attenuator 25 are moved, so that the total load on the direct current source 20 remains constant for all positions of the movable arms 30, 31, 32 and 33 of attenuator 25. Obviously, the minimum amount of direct current power is applied to the thermistor arm 14 when the arms 30, 31, 32 and 33 of attenuator 25 are positioned on the lowermost contacts of the resistor branches 26, 27, 28 and 29 respectively, that is, at the highest power step $P_1$ in Equation 1; and the maximum amount of direct current power is applied to the thermistor arm 14 when these arms are positioned on the uppermost contacts of the respective branches, that is, at the lowest power step $P_N$ in Equation 1.

To achieve a measurement of alternating current power the arms 30, 31, 32 and 33 of attenuator 25 are initially positioned on such contacts of the resistor branches 26, 27, 28 and 29 respectively, as will cause the occurrence of the zero indication. Then the plug 17 is inserted into the jack 16 to apply the source 18 of alternating current power to the thermistor arm 14 whereupon such alternating current power further energizes the thermistor arm 14 which changes its effective resistance and thereby causes the unbalance of bridge 10. This bridge unbalance causes the microammeter 19 to produce an indication different from zero. With appropriate adjustments of the alternating current power by the device 18a, the 100-microampere indication is again produced. This means that an amount of alternating current power, equal to 1 milliwatt of direct current power required to effect the same reading, is being applied to the thermistor arm 14. This provides power measurement on the basis of a direct indication by noting either the difference between the two readings on the calibrated attenuator 25, or the reading on the microammeter. For this purpose, the attenuator 25 can be calibrated in steps of 1 milliwatt as hereinafter explained.

If the amount of alternating current power supplied to the thermistor arm 14 is less than 1 milliwatt, the indication on the microammeter 19 will be less than 100 microamperes, but in terms of a fraction of 1 milliwatt. For example, an indication of 65 microamperes will indicate that 0.65 milliwatt of alternating current power is being supplied to the thermistor arm 14. If the alternating current power is more than 1 milliwatt but less than 2 milliwatts, the indication on the microammeter 19 will be greater than 100 but less than 200 microamperes. In this connection, a reading, for example, of 165 microamperes will indicate 1.65 milliwatts of power are being supplied to the thermistor arm 14.

A second method of accomplishing measurements of alternating current power involves balancing the bridge while the source 18 of alternating current power is applied to the thermistor arm 14. In this case the bridge 10 is initially balanced for direct current power to provide the zero indication as above described. Thereafter the attenuator 25 is so actuated that its arms 30, 31, 32 and 33 are moved in a downward direction to the extent of one or more contacts and thereby to remove 1 or multiples of 1 milliwatt of direct current power from the thermistor arm 14. This causes the microammeter 19 to indicate off-scale, below zero. Now the source 18 of alternating current power is applied to the bridge arm 14 in the manner above described, and the alternating current power adjusted until the zero indication is again restored. This means that 1 or multiples of 1 milliwatt of alternating current power is being applied to the thermistor arm 14. Thus the amount of alternating current supplied to the thermistor arm 14 is equivalent to the amount of direct current power previously withdrawn therefrom by the attenuator 25. This is indicated by the different between the readings of the calibrated attenuator 25 at the two zero indications. In case such alternating current power of source 18 is less than 1 milliwatt, the microammeter 19 will provide an indication in terms of a fraction of 1 milliwatt as mentioned above.

A third method of accomplishing measurements of alternating current power involves noting the amount of direct current power required to balance the bridge 10, Fig. 1, for the conditions (1) when the alternating current source 18 is disconnected from the thermistor arm 14, and (2) when the alternating current source 18 is applied to the thermistor arm 14. The difference between two such amounts of direct current power will be equal to the amount of alternating current power applied to the thermistor arm 14. Since the potentiometer 37 is calibrated in the range from 0 to 1 milliwatt as above mentioned, the attenuator 25 is also calibrated in steps of 1 milliwatt, commencing with the minimum amount of direct current power at the highest step $P_1$, Equation 1, and the maximum amount of direct current power at the lowest power step $P_N$, Equation 1. To obtain the full amount of direct current power for each of the above two conditions, the readings of attenuator 25 and potentiometer 37 are added together.

In one embodiment of Fig. 1, the circuit parameters used served to vary the direct current power into the thermistor arm 14 in 1 milliwatt step through the range from 7 to 18 milliwatts, such that the attenuator 25 was effective over the range from 7 to 18 milliwatts, and the potentiometer 37 for the range 0 to 1 milliwatt. The range of direct current power from 0 to 6 milliwatts is effective for establishing the resistance of the thermistor arm 14 at 125 ohms for the balanced condition in the bridge 10 whereby the zero indication is caused to occur on the microammeter 19.

What is claimed is:

An electrical circuit comprising a Wheatstone bridge having a resistance arm provided with a temperature coefficient of resistance, a source of alternating current power connected to said arm, an indicator connected across one bridge diagonal, a source of direct current power, and an adjustable resistance network for connecting said direct current source to the other bridge diagonal, comprising a path connected in series with one terminal of said direct current source and one terminal of said other bridge diagonal, said path including in sequence a first adjustable resistance branch, a movable contact, a resistor associated with said contact, and one terminal of said resistor, a second adjustable resistance branch connected in shunt of said direct current source, a fixed resistance branch connected across a second terminal of said resistor and the opposite terminal of said direct current source, and third and fourth adjustable resistance branches, each of said last branches being interposed in series with one terminal of said resistor, all of said adjustable resistance branches being mechanically connected together.

EDWARD W. HOUGHTON.

REFERENCES CITED

The following references are of record in the file of this patent:

UNITED STATES PATENTS

| Number | Name | Date |
|---|---|---|
| 1,590,420 | Chubb | June 29, 1926 |
| 1,791,563 | Horn | Feb. 10, 1931 |
| 1,039,925 | Gati | Oct. 1, 1912 |